Sept. 23, 1958          J. C. WARD          2,853,325
RESILIENT BEARINGS FOR RELATIVELY ROTATABLE MEMBERS
Filed Oct. 21, 1955          2 Sheets-Sheet 1
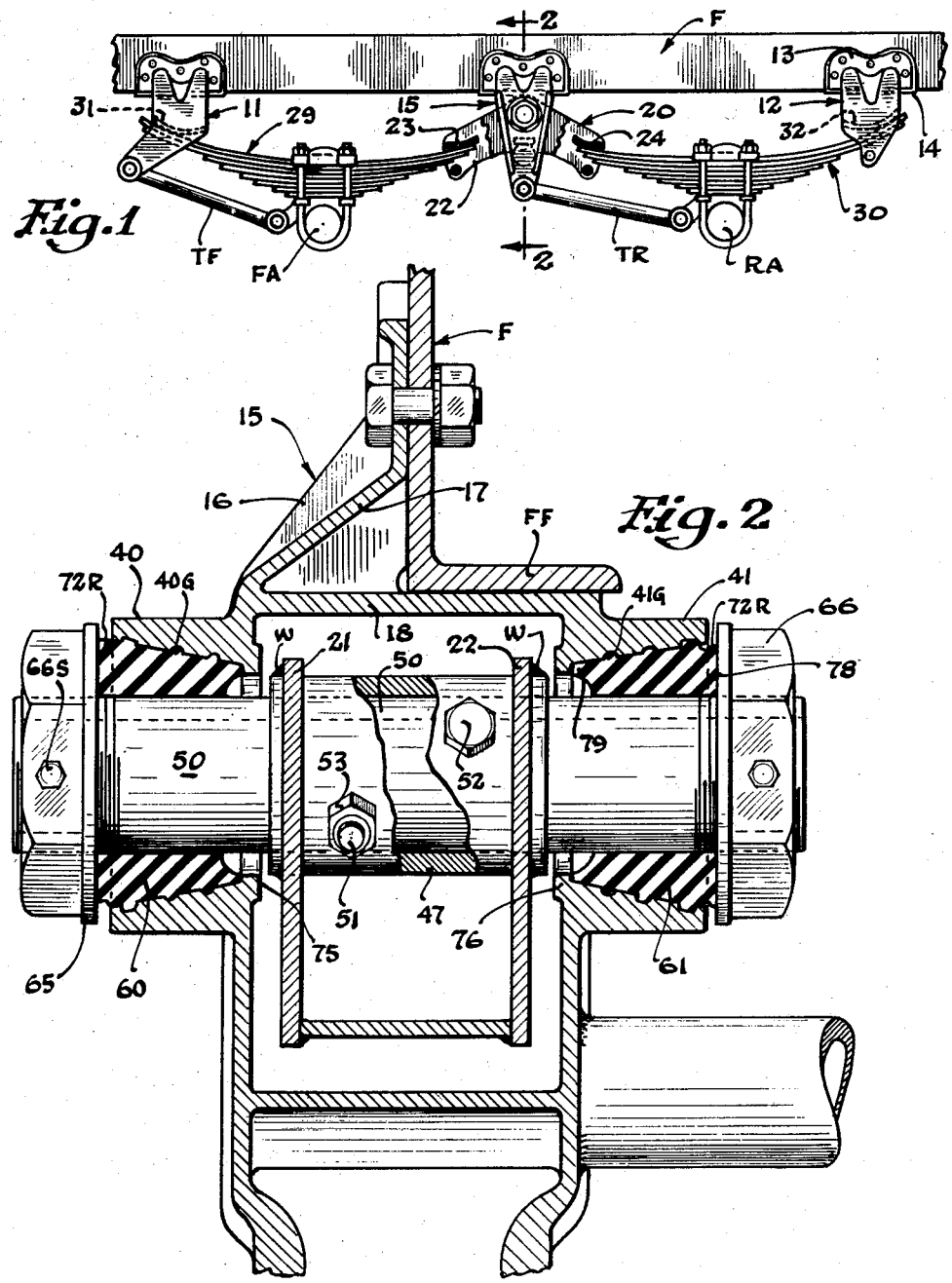
Inventor
James C. Ward
By Wallace and Cannon
Attorneys

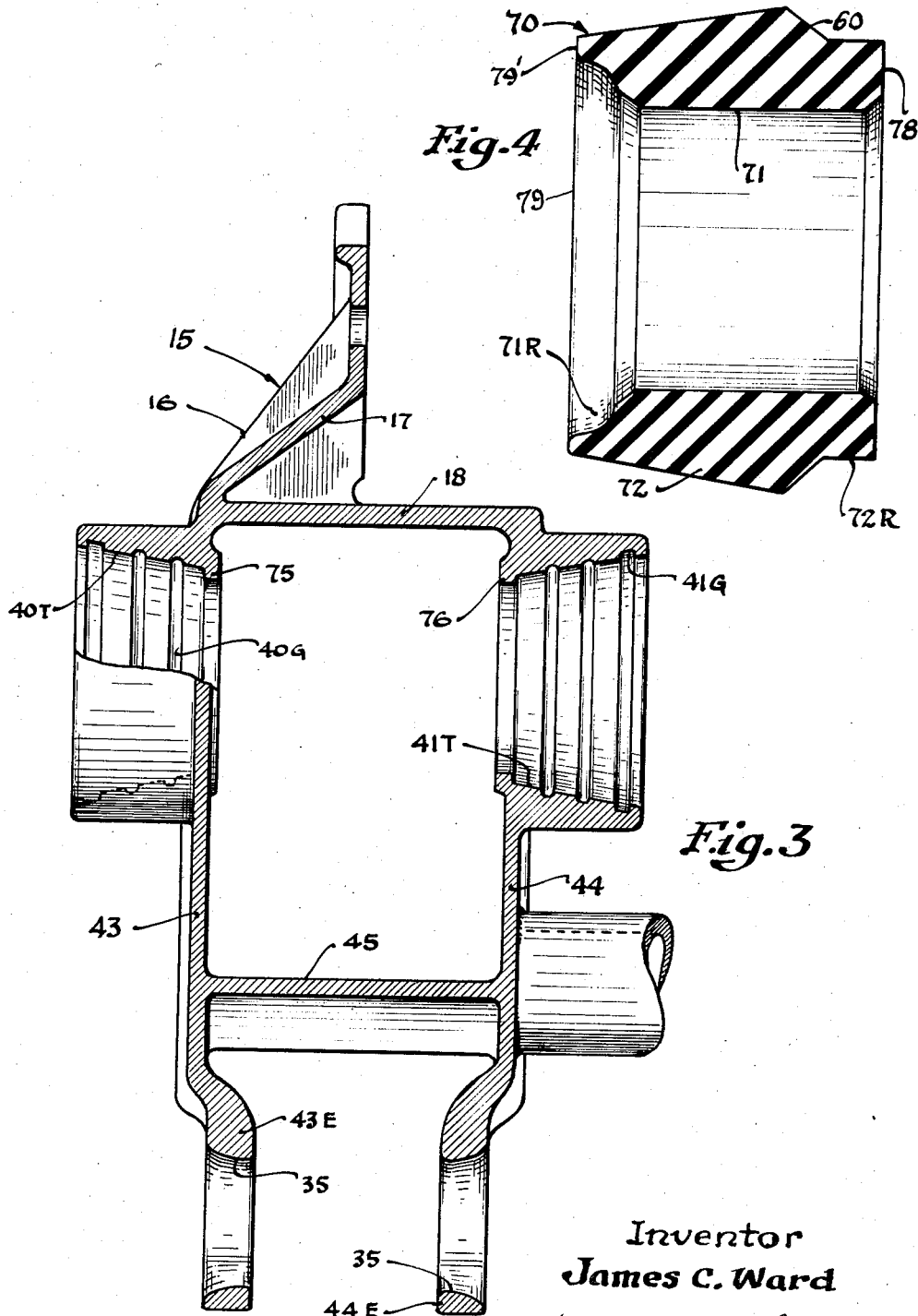

2,853,325

Patented Sept. 23, 1958

2,853,325

RESILIENT BEARINGS FOR RELATIVELY ROTATABLE MEMBERS

James C. Ward, Springfield, Mo., assignor, by mesne assignments, to Alaska Juneau Gold Mining Company, Los Angeles, Calif., a corporation of West Virginia Application October 21, 1955, Serial No. 541,895

15 Claims. (Cl. 287—85)

This invention relates to a resilient bearing and in particular to a resilient bearing adapted for use in connection with the equalizer of tandem spring suspensions for truck trailers.

Heavy duty trucks and trailers used for long distance or heavy over-land hauling are sometimes equipped with tandem axles at the rear of the trailer, and in instances where such tandem axles are independently suspended from the frame or chassis of the trailer it is advantageous to distribute the load or stress on an axle undergoing road impact to the other axle so that in effect equal distribution of the stress is attained. In achieving such load distribution, resort has been had to an equalizer for the independent spring suspensions of the two axles. This has commonly been referred to as a tandem spring suspension utilizing an equalizer, and in my United States Patent No. 2,653,034, patented September 22, 1953, I have disclosed apparatus embodying a spring suspension of this kind.

As described in the aforesaid patent, a pivotal equalizer beam is suspended from the frame of the vehicle having tandem axles, and the arrangement is such that ends of the leaf springs for these axles engage opposite ends of the equalizer beam. When a load engendered by impact is impressed on one axle, the equalizer beam in effect is pivoted by the end of that spring and part of the impressed load is then distributed by the equalizer to the adjacent end of the other spring that is associated with the equalizer beam.

In achieving the desired pivotal mounting for the equalizer, resort is had to an equalizer shaft which turns with the equalizer beam while supporting the equalizer beam for the desired pivotal movement, and it is necessary that this shaft in turn be supported for such pivoting movement by a bearing member. It is the primary object of the present invention to enable such bearing support to be achieved in a highly efficient manner and with a minimum of attendant maintenance.

Thus, in over-land automotive freight vehicles using tandem spring supports, it is desirable that such vehicles be capable of operating with a minimum of service over relatively long distances for sustained periods of time. Heretofore one of the chief problems in connection with trailers has been adequate lubrication of the bearing support for the equalizer shaft where such bearings have been of the kind requiring lubrication. Due to the exchange systems employed by trucking companies, there is no certainty that proper or periodic lubrication has been afforded. Moreover, adverse weather conditions, accumulations of dirt, and like factors encountered in sustained cross-country hauling, make proper maintenance of the equalizer bearing member particularly difficult, and another of the objects of the present invention is to eliminate the need of lubrication of bearings for an equalizer shaft of the aforesaid character.

It has been proposed in attempts to replace bearings requiring lubrication to resort to rubber bearings either of the so-called press fit type or the so-called bonded type each utilizing spaced metal sleeves and an interposed permanent rubber sleeve. In any event, however, the rubber sleeve, because of the method entailed in assembling the parts of the rubber bearing, is so tight that at all angles of attainable torque the rubber bearing always twists and does not allow for control of torsional wind up or resistance. In other words, in achieving the desired elimination of metal-to-metal wear, resilient bearings as heretofore constructed absorb all torque and have not been adapted to control the degree of torsional wind up or resistance which hinders the load distributing function of the equalizer beam.

It will be appreciated that in speaking of rubber bearings herein, mere oscillation of a shaft or the like is involved rather than complete rotation, and that such bearings are to take up, at least in part, the torque engendered in oscillating the shaft. Thus, the equalizer shaft of a tandem spring suspension is designed to rotate with the equalizer beam to achieve the desired distributing function of the equalizer beam. In other words, rubber bearings as heretofore constructed when subjected to torque stress beyond a certain point will shear or rupture instead of allowing slippage to occur, and prior to reaching this critical point more and more torsional resistance to further torque is set up in the body of the bearing. Such is not satisfactory in a tandem spring equalizer because, while it is advantageous to wind the resilient bearing to prevent slippage up to a certain point, it is also advantageous that the bearing allow the shaft to slip beyond that point so that the bearing will not build up torsional resistance opposing the torque of the equalizer shaft undergoing load distributing moments. Another of the important objects of the present invention is to enable this desired slip to occur for an equalizer shaft or the like that should oscillate uniformly within a range of turning moment without encountering resistance from the bearing.

Under the present invention, a rubber bearing is afforded of a kind adapted to be independently interposed removably and adjustably between the relatively movable member and the supporting member of a pivotal coupling. Thus, the present invention is applicable particularly in those instances where it is desired to reduce metal-to-metal wear between a shaft or the like that normally oscillates within a relatively limited range of turning moment. The arrangement is such that at relatively low angles frequently encountered within the aforementioned range the bearing is stressed torsionally thereby enabling the desired turning moment to be realized without slippage occurring. On the other hand, at relatively larger infrequent angles within the operating range the bearing, instead of twisting, yields so that the member of the coupling to which the turning moment has been applied slips in the bearing, allowing turning moments of larger magnitude to occur without torsional resistance from the bearing. This is particularly advantageous in tandem spring suspensions where it is essential that the equalizer beam be capable of distributing the load in the intended manner for the desired purpose.

Other specific objects of the present invention are to enable wear of the bearing to be accounted for merely by retightening the bearing; to reduce end-wear on the bearing at the point where the bearing is adapted to engage a shoulder on one of the members of the coupling; to prevent undesired bulging of the bearing at the end thereof that is to be loaded with compressive force to expand the bearing in the coupling; and to assure an effective clamp between the bearing and the relatively fixed member of the coupling so that the bearing is properly clamped in place to facilitate the desired bearing relations to be achieved.

Other and further objects of the present invention will be apparent from the following description and claims and are illustrated in the accompanying drawings which, by way of illustration, show a preferred embodiment of the present invention and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of a tandem spring arrangement in which the present invention may be advantageously embodied;

Fig. 2 is a sectional view on an enlarged scale taken substantially on the line 2—2 of Fig. 1;

Fig. 3 is a sectional view similar to Fig. 2 showing the hanger bracket for the equalizer; and Fig. 4 is a sectional view of a resilient bearing constructed in accordance with the present invention.

The present invention is illustrated in the drawings as embodied in a tandem spring suspension of the kind described with particularity in my aforesaid patent, and in such instance a spring suspension of this kind is associated with the opposite side frames as F, Fig. 1, of an automotive vehicle. This spring suspension is adapted to support a front axle FA and a rear axle RA from the frame F.

As described in the aforesaid patent, the tandem spring apparatus of Fig. 1 comprises a front hanger bracket 11 and a rear hanger bracket 12, each including a mounting plate 13 that is adapted to be suitably anchored against the outer face of the frame member F on either side of the vehicle. Each hanger bracket also includes a bottom flange 14 adapted to engage the lower face of each side frame member as F.

Intermediate the front and rear hanger brackets 11 and 12, there is afforded a center bracket 15 likewise including a mounting plate 13 adapted to be suitably anchored to the frame of the vehicle.

As shown in Figs. 2 and 3 the hanger bracket 15 is in the form of a relatively large casting, and the outer surface of this casting includes depending web structure 16 and 17 and a horizontal plate 18 adapted to seat against the lower face of the flange FF of the corresponding side frame member F of the vehicle.

The hanger 15 is adapted to support an equalizer beam 20 for pivotal movement as will be described in more detail hereinbelow. The equalizer beam 20 includes parallel side plates 21 and 22 which project in symmetrical relation in a forward and rearward direction from opposite sides of the bracket 15 as shown particularly in Fig. 1, and at the opposite ends the plates 21 and 22 support respective bearing members in the form of arcuate plates 23 and 24. Corresponding to the front axle FA is a compound leaf spring 29, and corresponding to the rear axle RA is another compound leaf spring 30. The adjacent or inner ends of these springs, it will be observed in Fig. 1, engage tangently the lower faces of the respective bearing plates 23 and 24, and it is this relation which enables the desired load distribution to be achieved through the equalizer as fully described in my aforesaid patent.

As shown in Fig. 1, the front hanger bracket 11 includes a downwardly bowed arcuate bearing plate 31 against the bottom face of which the forward end of the spring 29 is adapted to bear tangently, and when the tandem apparatus is in normal position, that is, under equal load conditions with respect to the two axles, the forward end of the spring 29 bears against the bearing member 31 adjacent the forward end thereof.

A similar arcuate bearing plate 32 is provided at the rear hanger bracket 12, and the arrangement is such that the rearward end of the spring 30 normally engages tangently the lower face of the bearing member 32 adjacent to the rear end thereof. The arcuate configuration of the bearing plates 31 and 32 is such that when the spring 29 is deflected upwardly upon the front axle FA being deflected upwardly by an impact encountered on the road, the spring 29 in effect is straightened so that the forward end thereof travels in a rearward direction along the arcuate surface afforded by the bearing member 31. At the same time, the rearward end of the spring 29 in effect travels in a rearward direction on the bearing member 23 of the equalizer beam 20. This movement is manifest in the equalizer beam 20 pivoting clockwise as viewed in Fig. 1 so that the bearing member 24 thereof is brought to bear with a downwardly directed force against the forward end of the spring 30 engaged therewith. This has the effect of distributing to the spring 30 part of the stressing of the spring 29 due to the impact encountered by the axle FA to thereby achieve the desired load distribution. The converse of the foregoing will be readily apparent, and is fully described in my aforesaid patent.

It is not deemed necessary to describe in detail the way in which the axles FA and RA are bracketed to the mid-points of the springs 29 and 30 inasmuch as this is set forth in detail in my aforesaid patent. It may be mentioned briefly, however, that so-called torque arms TF and TR are associated with the respective supports for the axles FA and RA. These arms are adjustable in a longitudinal sense by adjustable torque arm means as described in my aforesaid patent to enable the axles to be accurately related. The eccentric bushing means for the torque arm TR is adapted to be carried in sockets 35, Fig. 3, at the lower end of the center bracket 15, and similar sockets are provided at the lower end of the front bracket 11 for the forward end of the torque arm TF.

In achieving the desired oscillation of the equalizer beam 20, the center bracket 15 is provided with bosses 40 and 41, and the inner walls of these bosses are tapered at 40T and 41T as shown particularly in Fig. 3. The tapered inner walls 40T and 41T are provided with a plurality of annular grooves 40G and 41G, and the reason for these particular structural features will be described in detail herein below.

Extending downwardly from the bosses 40 and 41 are spaced apart side walls 43 and 44, and these walls are interconnected by a cross brace 45. The side plates 43 and 44 include downward extensions 43E and 44E, Fig. 3, provided with the openings 35 mentioned above as adapted to receive the forward end of the adjustable torque arm TR.

It will be observed in Fig. 3 that a relatively large internal cavity or housing is afforded within the center bracket 15, this housing being defined by the top plate 18, the side plates 43 and 44 and the bottom cross brace 45, and within this housing the equalizer beam 20 is balanced. To this end, the equalizer beam is provided with a relatively short sleeve 47, this sleeve being passed through aligned openings formed medially in the side plates 21 and 22 of the equalizer beam and secured thereto as by welds W. In mounting the equalizer beam on the bracket 15, the equalizer beam is first arranged within the housing of the bracket 15 that was described above and is positioned so that the bore of the sleeve 47 is aligned with the bores of the bosses 40 and 41. An equalizer shaft serving as a pivot means for the beam 20 so as to oscillate therewith is then centered in one of the bosses and passed through the sleeve 47 of the equalizer beam until the opposite end thereof reposes in the opposite one of the bosses. Two lock bolts 51 and 52 are then seated in respective openings provided in the sleeve 47 and the equalizer shaft 50, these openings of course being brought into registry to enable the bolts 51 and 52 to be properly seated. The equalizer beam and shaft are then locked together by lock nuts as 53.

Under the present invention, a pair of identical rubber bearings 60 and 61 are afforded for the end portions of the equalizer shaft 50 reposing in the bosses 40 and 41 so as to couple the oscillatable equalizer to the support therefor represented by the bosses of the bracket 15. Thus, it will be observed in Fig. 2 that these resilient bearings are removably mounted on the opposite ends of the oscillatable equalizer shaft. When this has been accomplished washers 65 and associated nuts 66 are tightened on the corresponding threaded ends of the equalizer shaft 50 to load the bearings 60 and 61 with a predetermined amount of axially directed compression. Lock bolts as 66S are preferably utilized to lock the nuts 66 in place.

One such resilient bearing 60 constructed in accordance with the present invention is illustrated in normal, unmounted state in Fig. 4. This bearing includes a body portion 70 of solid rubber or of any other suitable resilient material, and has an inner wall 71 of uniform diameter corresponding to that of the equalizer pivot means 50 so that the bearing may be readily pressed with relative ease on to and removed from an exposed end of the equalizer shaft. The outer wall 72 of the bearing of the present invention is tapered complementary to the tapered walls 40T and 41T of the bosses 40 and 41 so as to be capable of being wedged in the annular space that separates the opposed walls of the equalizer shaft 50 and the corresponding bosses 40 and 41. In the present instance, this taper is approximately 17 degrees.

It will be recognized that during the course of operation of the apparatus shown in Fig. 1, the equalizer beam 20 undergoes oscillation depending upon which axle is first loaded. The range of turning moment that is thus set up in the equalizer beam is not particularly large, and for present purposes it may be considered that such oscillations probably do not exceed about 15 degrees of arc on either side of the beam axis; in other words a total range of turning moment of about 30 degrees, and under most circumstances the angle of oscillation in one direction will probably not be much more than about ten degrees.

At relatively low or frequently encountered normal angles of oscillation of the equalizer beam 20, the bearings 60 and 61 under compression between the opposed walls of the equalizer shaft 50 and the supporting bosses 40 and 41 therefor normally wind up with the equalizer shaft 50 oscillating with the equalizer beam 20, and this torsional wind up or angular twist in the body of the bearing will occur through substantially the same angle. In other words, the bearings 60 and 61 are compressed to such an extent as to bind tightly about the equalizer shaft 50 so that relatively low or frequently encountered angular movements of the equalizer beam, say about 5 degrees, are transmitted to the bearings which are held to the bushings against rotation. The wedge-like and grooved construction of the bosses 40 and 41 serves to assure that these desired binding and holding relations are attained. Thus, when the bearings 60 and 61 are first slipped on to the equalizer shaft 50 the opposite inner and outer walls 71 and 72 thereof are in the normal condition illustrated in Fig. 4. When properly positioned, the inner ends of the bearings 60 and 61 engage corresponding end limit means in the form of annnular shoulders 75 and 76 provided at the respective inner ends of the bosses 40 and 41. Then, when the bearings are compressively loaded upon tightening the nuts 66 as mentioned above, portions of the bearings about the tapered outer walls thereof flow or expand into the grooves 40G and 41G so as to constitute a friction lock between the bearings and the bosses 40 and 41. Such loading of the bearings is selectively adjusted by the nuts as 66, and these nuts also enable normal wear or set of the bearings to be taken up by tightening the nuts to the degree required to overcome wear or set that has occurred due to continued operation of the equalizer apparatus.

In loading the bearings compressably by the nuts 66, it will be appreciated that the limit means represented by the shoulders 75 and 76 on the bosses enable this to be accomplished so that each bearing is compressed between the opposite ends thereof that are respectively engaged by an end stop in the bosses and the adjusting nut that determines the amount of compressive force applied. Of particular importance in the present instance is that the bearings 60 and 61 can thus be loaded so as to enable the equalizer shaft 50 to slip in the bearing rather than to continue to twist the bearing at releatively high torque angles of the equalizer represented by a relatively heavy load impressed upon either axle FA or RA of the vehicle. Thus, it is disadvantageous in apparatus of the kind shown in Fig. 1 for bearings as 60 and 61 at the higher torque angles such as 7-10 degrees to tend to resist oscillation of the equalizer, but it is also advantageous that at the frequently encountered low torque angles the bearings be allowed to twist so as to eliminate surface wear between the bearings and the equalizer shaft. Accordingly, depending upon the particular operational condition that is expected to be encountered, the nuts 66 are tightened so that at the higher torque angles, about 7-10 degrees or above, where the bearings might tend in wound or twisted condition to resist or prevent altogether continued oscillation of the equalizer, the bearings yield to the torsional load on the equalizer shaft or pivot means thereby allowing the latter to slip freely toward the end point of turning moment. An important advantage to this particular relation is that the life of the bearing is materially prolonged inasmuch as at high torsional loads where the bearing is likely to become permanently distorted, yield occurs that enables the equalizer to undergo relation slipping, and in this connection it will be borne in mind that the angle of slip will not be so large as to cause undue wear on the inner wall 71 of the bearing.

At the end of the bearing where the compressive load is applied to expand the bearing, the outer wall 72 is relieved or reduced in diameter at 72R, Fig. 4, to afford a projection 78 of reduced radial dimension as shown in Fig. 4. The projection 78 is engaged directly by the washer 65 which, it will be observed in Fig. 2, completely covers the projection 78 so as to compress the bearing uniformly while the corresponding nut is being tightened. Thus, there is no outward end bulging of the bearing during tightening of the nut as 66, so that when the bearings have been fully loaded as shown in Fig. 2 there are no portions of the bearings squeezed between the washers 65 and the end walls of the bosses 40 and 41. In other words, the force of the means used to compress the bearings against the limit end stops 75 and 76 is utilized in a highly efficient manner, developing fully the latent expansive properties of the bearings when compressed by opposing end forces set up in accordance with the present invention. Additionally, the inner wall of the bearing at the opposite end, that is, the end that is to engage the limit means on the boss of the hanger 15 is relieved in a radial inwardly tapered fashion proceeding in the direction of the projection 78 to provide the inner wall of the bearing with a tapered portion at 71R. The tapered inner wall portion 71R of the bearing merges outwardly into an end projection 79 of reduced radial dimension, and the extremity of the end projection has a flat face 79', Fig. 4, complemental to and adapted to bear against the limit means 75 and 76, and such radial tapered relieving of the inner end of the bearing to dimension the width of the flat face 79' substantially to the corresponding dimension of the limit shoulder 75 or 76 as shown in Fig. 2 reduces cutting or end wear at this end of the bearing. Thus, the bearing as 70 at the end opposite the projection 78, Fig. 4, is defined by a flat and relatively narrow annular face 79', and the inner diameter of the face 79' merges with the adjacent extremity of the tapered portion 71R so as to be substantially co-terminal therewith.

The present invention, it will be seen, enables an oscillating member having a small operating arc to be supported by a resilient bearing in a relation in which the desired antifriction relation is achieved by the nature of the bearing. This bearing is adapted to be in effect held tightly to the opposing or relatively fixed member of the coupling by expanding the bearing outwardly to a predetermined degree, and the relation is such that the bearing is twisted or wrapped up during normal oscillation of the apparatus until a point is reached where the applied torque overbalances the internal resistance of the bearing in wound up state whereupon slippage occurs, and this is of particular advantage in a spring equalizer beam of the kind described wherein it is desirable that the equalizer beam be capable of pivoting freely and without resistance from the bearing caused by excessive wind up in the resilient bearing.

In contrast to rubber bearings as heretofore constructed, the bearing in the present instance may be replaced with relative ease merely by loosening the means that are used to compressably load the bearing, whereupon the bearing may be withdrawn from the coupled parts. Of particular importance is that the bearing may be loaded to a predetermined degree depending upon anticipated variations in desired slip point. After prolonged use at one setting, a new load may be set up through adjusted position of the nuts 66 if such be deemed advisable.

Hence, while I have illustrated and described the preferred embodiment of my invention, it is to be understood that these are capable of variation and modification, and I therefore do not wish to be limited to the precise details set forth, but desire to avail myself of such changes and alterations as fall within the purview of the following claims.

I claim:

1. A sleeve-like resilient bearing adapted to be interposed in bearing relation between an oscillatable member and a relatively fixed supporting member therefor that has a tapered wall spaced from the oscillatable member and including, an inner wall having a diameter enabling the bearing to be removably mounted on said oscillatable member, a tapered outer wall on the bearing tapered complementary to and adapted to engage the tapered wall of said supporting member, said outer wall of the bearing at one end thereof benig reduced in diameter to afford an annular projection of reduced dimension against which compressive forces may be applied uniformly in an axial direction to expand the bearing radially between the opposed walls of said members, the opposite end of the bearing being defined by a flat annular face of relatively narrow width, and the inner wall of the bearing at the portion adjacent said flat face being tapered in a radial inward fashion in a direction proceeding toward said annular projection to afford a second annular projection of reduced dimension adapted to engage an end limit shoulder of complemental dimension on said supporting member.

2. A sleeve-like resilient bearing adapted to be interposed in bearing relation between an oscillatable member and a relatively fixed supporting member therefor that has a tapered supporting wall opposite the oscillatable member and including, a body portion having an inner wall of a diameter enabling the bearing to be removably mounted on said oscillatable member, said body portion having an outer wall tapered complementary to the tapered wall of said supporting member, the inner wall of said bearing from a point inwardly of one end thereof being tapered and said taper terminating adjacent a flat annular face defining such one end of the bearing and adapted to engage end limit means of complemental dimension on said supporting member, and the outer wall of said bearing at the opposite end thereof being relieved to afford a projection of reduced dimension at such end adapted to be compressed by axially directed forces to expand the bearing between said members without substantial outward end bulging.

3. A resilient bearing adapted to be interposed in bearing relation between the opposed walls of an oscillatable member and a supporting member therefor and comprising, a body portion affording inner and outer walls, the outer wall of the bearing being formed complementary to said wall of said supporting member, one end of said bearing about said outer wall being relieved to afford a projection of reduced dimension against which compressive forces may be applied axially to expand the bearing radially between said walls of said members, and the other end of said bearing being defined by a flat annular face, and the inner wall of said bearing being tapered radially inwardly in part from said flat annular face to afford a projection of reduced dimensions adapted to engage limit means of complemental dimension on said supporting member.

4. In a coupling comprising an oscillatable member and a relatively fixed supporting member therefor, a resilient bearing interposed in bearing relation between said members, said bearing including a body portion affording inner and outer walls engaging directly and respectively opposed walls of said members, a projection of reduced dimension at one end of said bearing against which compressive forces may be applied to expand tightly and uniformly the bearing between said members, the other end of said bearing including a projection of reduced dimension adapted to engage complemental end limit means on said supporting member, and the wall of said supporting member engaged by said bearing including a groove into which a portion of said bearing is expanded.

5. In a coupling, a member adapted to have imparted thereto a predetermined amount of turning moment, a supporting member for the member having turning moment, said supporting member having a wall spaced radially from the first-named member and formed with at least one groove therein, a resilient bearing interposed in bearing relation between and in direct engagement with said members and including a wall formed complementary to said wall of the supporting member, and means acting between opposite ends of said bearing to expand said bearing radially so that at least a portion thereof expands into said groove to assist in holding the bearing stationary in said coupling, whereby at relatively low torque angles of the member having turning moment said bearing winds up therewith while at higher of such torque angles the member having turning moment slips in said bearing.

6. In a coupling, a shaft adapted to have turning moment imparted thereto, a supporting member for the shaft concentric thereto and relative to which the shaft has turning moment, said supporting member having a tapered wall spaced from said shaft and provided with grooves therein, a resilient bearing interposed in bearing relation between said shaft and said supporting member and having the resilient surfaces thereof directly engaging said shaft and said supporting member, said resilient bearing including a wall tapered complementary to said tapered wall of the supporting member, and means acting between opposite ends of said bearing to expand said bearing so that portions thereof expand into said grooves.

7. In a coupling, a pair of concentrically related members of which one is adapted to oscillate through predetermined angles relative to the other, the other of such members having an inner wall spaced from said one member and being provided with grooves, a resilient bearing interposed between said members, and means acting between opposite ends of said bearing to hold said bearing expanded between and in direct bearing engagement with said members with portions thereof expanded into said grooves.

8. In a tandem spring load equalizer of the kind described, an equalizer beam including means affording a shaft pivotally related to a support therefor so as to undergo pivotal movement in distributing loads between the respective tandem springs associated therewith, a resilient bearing having inner and outer walls interposed between and in direct bearing engagement with said equalizer shaft and the support therefor, said bearing including one end projection of reduced dimension about the outer wall of the bearing and to which compressive forces are applied axially to expand the bearing between the equalizer shaft and the support therefor, said bearing including another end projection of reduced dimension about the inner wall of the bearing and engageable with end limit means on said support of complemental dimension, and spaced annular means formed about said support and frictionally related to the outer wall of said bearing to clamp the bearing to said support against circumferential slip so that at low pivot angles of said equalizer shaft the body of the bearing winds up with the equalizer shaft undergoing equalizing movement, while at higher pivot angles the equalizer shaft slips in the bearing to enable load distribution to occur at such higher pivot angles without interference from said bearing.

9. A resilient sleeve-like bearing adapted to be interposed between and engage in bearing relation between the opposed walls of concentrically related members of which one is adapted to turn relative to the other and comprising, a body portion having inner and outer walls respectively engageable with the opposed walls of said concentrically related members, one end of said bearing being defined by a flat annular face adapted to engage limit means provided on one of said members to enable the bearing to be loaded, the inner wall of said bearing adjacent said flat annular face being tapered radially inwardly in part from said flat annular face, and said bearing including at the opposite end a projection of reduced dimension against which axially directed compressive loading forces may be applied forcing the flat face at the one end of the bearing tightly against said limit means and expanding the bearing radially between said concentrically related members without substantial end bulging.

10. A sleeve-like resilient bearing adapted to be interposed between an oscillatable member and a relatively fixed supporting member therefor that has a tapered wall spaced from the oscillatable member and including, an inner wall having a portion of uniform diameter enabling the bearing to be mounted on the oscillatable member, a tapered outer wall on the bearing tapered complementary to and adapted to engage the tapered wall of said supporting member, said outer wall of the bearing at one end thereof being reduced in diameter to afford an annular projection of reduced radial dimension against which compressive forces may be applied axially to expand the bearing between said members without substantial end bulging, said bearing at the opposite end being defined by a flat annular face, and the inner wall of the bearing in the portion between said flat face and the first-named portion thereof being tapered radially inwardly from said flat face.

11. In a tandem spring load equalizer of the kind described, an equalizer beam having pivot means balanced on a support therefor so as to be capable of pivotal movement in opposite directions about said support to distribute loads between the respective springs associated therewith, a resilient bearing for said equalizer beam having an outer resilient wall engaging directly said support and an inner wall in direct engagement with said pivot means, said bearing tightly being loaded by compressive forces applied axially thereto to expand the bearing tightly between the pivot means and said support and to yieldably bind the bearing to the pivot means, and means formed in spaced circumferential relation about said support and engaging the outer wall of said bearing to hold the bearing to said support normally against slip in its expanded state, so that at frequently encountered low load pivot angles of said equalizer beam the bearing winds up torsionally therewith through substantially the same angle, while at higher load pivot angles the bearing yields to the equalizer beam to enable the equalizer beam to slip relative to the bearing.

12. In a tandem spring load equalizer of the kind described, an equalizer beam having pivot means balanced on a support therefor so as to be capable of pivotal movement in opposite directions about said support to distribute loads between the respective springs associated therewith, a resilient bearing for said equalizer beam having an outer wall engaging directly said support and an inner wall in direct engagement with said pivot means, adjustable means to apply a predetermined compressive force to the bearing to expand the bearing between the pivot means and said support and to yieldably bind the bearing to said pivot means, and means formed in spaced circumferential relation about said support and engaging the outer wall of said bearing to hold the bearing to said support against slip relative to said support, so that at frequently encountered low load pivot angles of said equalizer beam the bearing winds up torsionally therewith through substantially the same angle while at higher load pivot angles the bearing yields to the equalizer beam to enable the equalizer beam to slip relative to the bearing.

13. In a coupling comprising an oscillatable member and a relatively fixed supporting member therefor, a resilient bearing interposed in bearing relation between said members, said bearing including a body portion having inner and outer walls engaging respectively opposed walls of said members, adjustable means at one end of said bearing loading the bearing with predetermined compressive forces to expand the bearing between said members, said bearing including means thereon cooperating with said supporting member to enable said compressive forces to be established as aforesaid, and the wall of said supporting member engaged by said bearing including a groove into which a portion of said bearing is expanded.

14. In a coupling a member having turning moment, a supporting member for the member having turning moment, said supporting member having a wall spaced from the first-named member, a resilient bearing interposed in bearing relation between said members with the resilient surfaces thereof engaging said members directly and including a wall formed complementary to said wall of the supporting member, means in part adjustable acting between opposite ends of said bearing to expand said bearing tightly between and in engagement with said members, and spaced apart annular means on said support for applying circumferential friction forces to said wall of said bearing so that at relatively low torque angles of the member having turning moment said bearing winds up torsionally therewith through substantially the same angle, while at higher torque angles the bearing yields to the member having turning moment so that the member having turning moment slips in the bearing.

15. In a coupling a pair of concentrically related members of which one is adapted to oscillate through predetermined angles relative to the other, a renewable resilient bearing interposed between said members with resilient surfaces thereof directly engaging said members and removably mounted on one such member, the relatively fixed one of such members having grooves therein in which surface portions of said bearing are expanded so as to hold the bearing thereto against rotation, and adjustable means loading the bearing with a predetermined amount of axially applied compressive force to expand the bearing radially against said members to enable the bearing to be held as aforesaid and to yieldably bind the bearing to the oscillating member, so that at relatively low torque angles of the oscillatable member the bearing is stressed torsionally therewith, while at higher of such torque angles the stressed bearing yields, to enable said oscillatable member to slip relative thereto.

(References on following page)

References Cited in the file of this patent

UNITED STATES PATENTS

| | | |
|---|---|---|
| 1,971,676 | Borst | Aug. 28, 1934 |
| 2,062,290 | Bott | Dec. 1, 1936 |
| 2,517,791 | Hutton | Aug. 8, 1950 |
| 2,719,711 | Nallinger | Oct. 4, 1955 |

FOREIGN PATENTS

| | | |
|---|---|---|
| 478,477 | Great Britain | Jan. 19, 1938 |
| 813,760 | France | Mar. 1, 1937 |